United States Patent

[11] 3,525,285

| [72] | Inventors | Clarence R. Van Niel<br>North Olmsted, Ohio;<br>William L. Seitz, Parma, Ohio |
|---|---|---|
| [21] | Appl. No. | 765,947 |
| [22] | Filed | Oct. 8, 1968 |
| [45] | Patented | Aug. 25, 1970 |
| [73] | Assignee | Tinnerman Products, Inc.<br>Cleveland, Ohio<br>a corporation of Ohio |

[54] FASTENING ASSEMBLY DEVICE
10 Claims, 11 Drawing Figs.

[52] U.S. Cl. .................................................. 85/75,
85/81, 151/41.75
[51] Int. Cl. ............................................. F16b 13/04
[50] Field of Search .................................. 151/41.75;
85/80, 81, 82, 84, 72, 75

[56] References Cited
UNITED STATES PATENTS

| 2,246,722 | 6/1941 | Del Camp | 151/41.75 |
| 2,632,615 | 3/1953 | Churchill | 85/80 |
| 2,635,666 | 4/1953 | Murphy | 85/80 |
| 2,779,377 | 1/1957 | Flora | 85/81 |
| 3,139,251 | 6/1964 | Walsh | 151/41.75 |

Primary Examiner—Edward C. Allen
Attorney—Teare, Teare and Sammon

ABSTRACT: A fastening assembly device for mounting an article in spaced, superposed relation on an apertured support member including a resilient retainer member insertable into the aperture in the support member and an expander member insertable into initial generally floating and final locking positions within the retainer member, and a connector member carried by the expander member for mounting the article on the support member.

Patented Aug. 25, 1970

INVENTORS
CLARENCE R. VAN NIEL
WILLIAM L. SEITZ
BY

Teare, Teare & Sammon

ATTORNEYS

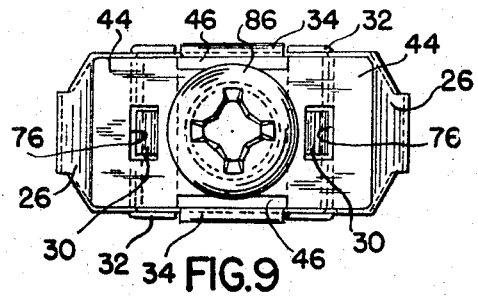
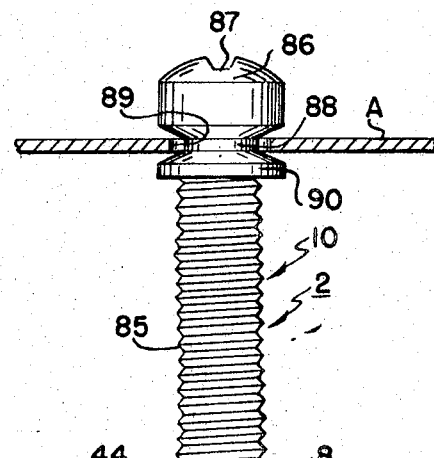
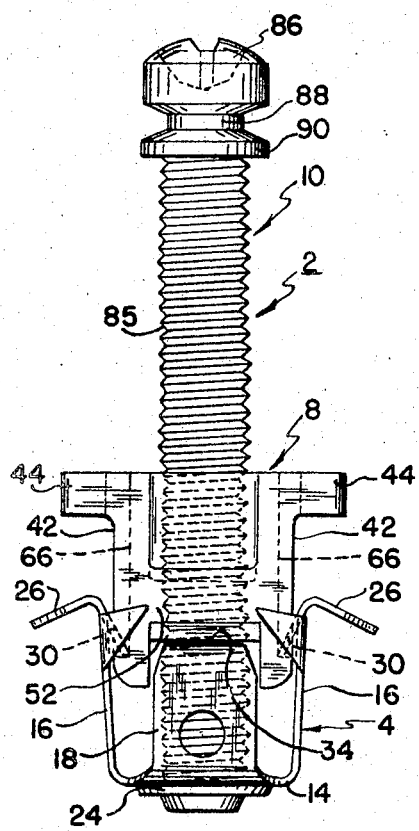
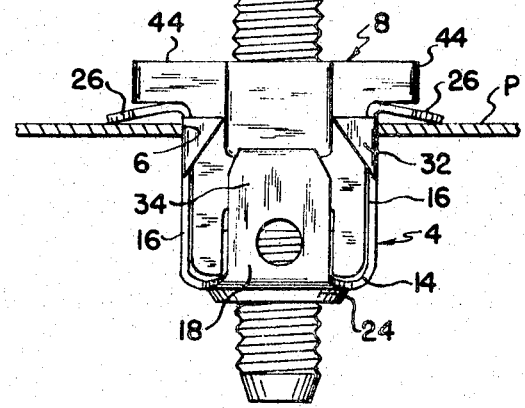
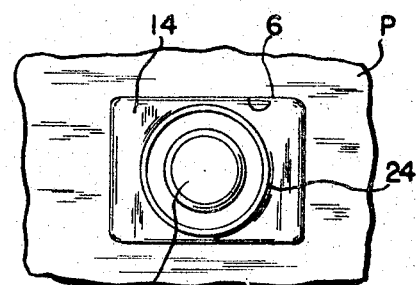

FASTENING ASSEMBLY DEVICE

BACKGROUND OF THE INVENTION

The present invention relates generally to fastening devices, and more particularly relates to a novel fastening device assembly for mounting an article, such as a panel, in spaced, superposed relation on a support member. The device of the invention has particular application for use in mounting an article, such as a head lamp of the like, for use in the automotive field.

Heretofore, various one or two-piece fasteners, such as of the plug or bushing types, have been employed for mounting various connectors, such as screws, pins or the like, on an apertured support member. Such prior devices have generally included yieldable flange or finger constructions for simple snap-action locking engagement with the support member. However, these devices have not been satisfactory for many applications. Importantly, such devices have not contemplated the problem of mounting an article, such as an automotive head lamp, in spaced, superposed relation on a support member, particularly in applications where blind or inaccessible installations are required. Moreover, these devices have not contemplated such mountings in applications where tolerance variations exist between the parts or where vibratory forces are imparted to the parts during normal usage thereof. In addition, such prior devices, therefore, have not provided adequate holding or locking power with the support member and/or article and have not afforded wide usability with various size article connectors while stocking a minimum number of parts.

Typical of prior art fastening devices are disclosed in the U.S. patents to Murphy 2,283,122, Kost 2,400,545, and Biesecker 3,065,035.

SUMMARY OF THE INVENTION

A fastening device assembly for mounting an article in spaced, superposed relation on an apertured support member comprising, a retainer member adapted for insertion to the aperture in said support member and an expander member adapted for insertion into locking engagement within said retainer member, and a connector member carried by said expander member for adjustably mounting said article in said spaced relation on said support member. The retainer member includes a plurality of resilient arms having finger means cooperative with abutment and channel means on said expander member for holding the same and said connector member in initially inserted, pre-assembled and finally inserted, locked positions within said retainer member. The arms include projecting means cooperative with said finger means for engagement with opposed sides of said support member to prevent axial movement of the assembly relative to said support member, and tang means cooperate with said arms to prevent lateral shifting movement of said expander member relative to said retainer member. The expander member includes a bore adapted to threadably receive therethrough said connector member and the retainer member includes a base mounting said arms having an enlarged opening for receiving said connector member therethrough so that the connector member carried by said expander member is disposed in floating relation within said retainer member relative to said support member.

By the foregoing arrangement, there is provided a novel fastening assembly device which can be produced and pre-assembled as a multiple, such as two or three-piece, unit for ready and efficient application in mounting an article in spaced, superposed relation on an apertured support member. The device includes an expander member which can be pre-assembled with a retainer member for use as a two-piece unit with a connector member, or which can be pre-assembled with the retainer member and the connector member for use as a three-piece unit. By this arrangement, the expander member is readily interchangeable for use with the retainer member so that various size connector members can be carried by the expander member for mounting various types and sizes of articles without the requirement to stock a great number of parts for various applications. The expander member can be readily pre-assembled with the retainer member in releasibly locked telescoping relation so as to be inserted, as a unit, into the aperture in the support member by simple push-action on the expander member without the requirement for special tools and/or equipment. In its inserted position, the device imparts a good holding action with the support member to prevent axial and/or lateral shifting movement between the parts. In its pre-assembled position, the expander member is disposed in a generally floating condition within the retainer member so that the connector member is also enabled to float into position within the retainer member to provide allowance for misalignment between fastened parts, particularly where tolerance variations exist for many applications.

BRIEF DESCRIPTION OF THE DRAWINGS

FIG. 8 is a side elevation view of the pre-assembled fastening device of the invention with a connector member in place;

FIG. 9 is a top plan view of the pre-assembled fastening device of FIG. 8;

FIG. 10 is a fragmentary, side elevation view, partly in section, of the fastening device of the invention showing the assembled device mounted in a panel in accordance with the invention and supporting a panel; and FIG. 11 is a fragmentary, bottom plan view of the assembled fastening device of FIG. 10.

DESCRIPTION OF THE PREFERRED EMBODIMENTS

Figure 2:
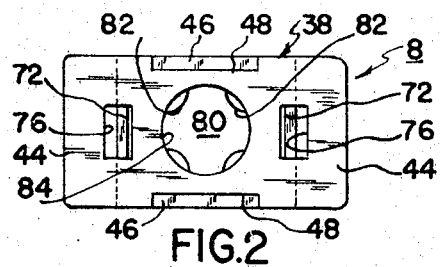
FIG. 2 is a top plan view of the expander member of FIG. 1.
Figure 1:
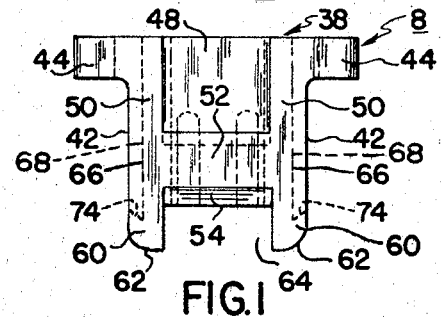
FIG. 1 is a side elevation view of the expander member of the invention.

In general, and with reference to FIGS. 8 and 10 of the drawings, the fastening assembly device, designated generally at 2, is shown for mounting an article A in spaced, superposed relation on a support member P, such as a panel or the like. As shown, the device 2 includes a retainer member 4 adapted for insertion through an aperture 6 in the support member P and an expander member 8 adapted for insertion into locking engagement within the retainer member 4. A connector member 10 is threadably carried by the expander member 8 for adjustably mounting the article A in the aforesaid spaced relation with respect to the support member P. In the invention, the expander member 8 may be pre-assembled in releasably locked and telescoping relation (FIG. 8) within the retainer member 4 so as to hold the connector member 10 in a generally free floating condition with respect to the retainer member 4 for installation, as a unit, within the aperture 6 in the support member P. As installed, the parts coact in interlocking relation to prevent axial and/or lateral movement between the parts and with respect to the support member P and to hold the article A in spaced, generally vibration dampening relation with respect to the support member.

Figure 6:
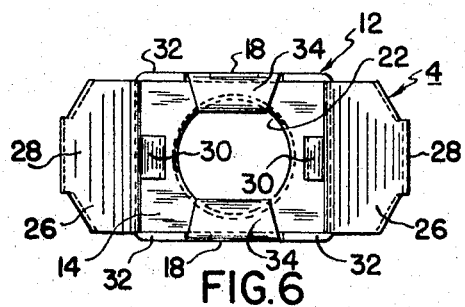
FIG. 6 is a top plan view of the retainer member of FIG. 5.
Figure 5:
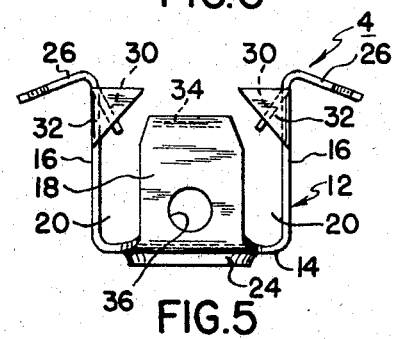
FIG. 5 is a side elevation view of the retainer member of the invention.
Figure 7:
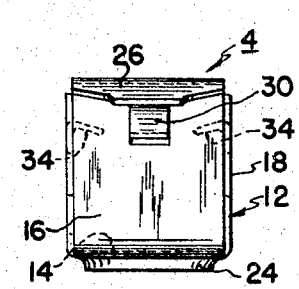
FIG. 7 is an end elevation view of the retainer member of FIG. 5.

As best seen in FIGS. 5—7, the retainer member 4 may be made from a single blank or piece of strip material having good resilient spring-like characteristics, such as spring steel or the like. In the form shown, the member 4 may be bent to provide a generally polygonal, box-like body 12 defined by a generally flat base 14 having a first pair of spaced, oppositely disposed arms 16 which extend generally parallel from the ends of the base 14 and a second pair of spaced, oppositely disposed arms 18 which extend generally parallel from the sides of the base 14. The arms 16 and 18 are of a flexible resilient construction with the arms 18 extending transversely between or at right angles to the arms 16 to provide the box-like construction shown. The arms 18 are foreshortened in length with respect to the arms 16 and have a transverse width less than the transverse width of the arms 16 so as to provide slot-like separations as at 20, adjacent the four corners of the body 12 which are disposed in the general plane of the arms 18.

In one form, the base 14 may be provided with an enlarged central opening 22 (FIG. 6) defined by the endless downwardly depending rim-like skirt portion 24. The skirt portion 24 preferably has a diameter greater than the maximum transverse dimension of the connector member 10 so that there is provided an optimum clearance area for receipt of the leading end portion of the connector member 10, whereby the same may be disposed in a generally free floating condition within the retainer member 4 to accommodate for any misalignment between the installed parts.

The end arms 16 terminate adjacent the upper free end in resilient flange wing portions 26 which extend angularly outwardly and downwardly in a general direction toward the base 14 adapted for abutment against one side of the support member P (FIG. 10) for limiting axial movement of the retainer member with respect to the support member P and which provides a resilient vibration dampening mounting for the connector member 10. The wings 26 (FIG. 6) may have a tapered end construction, as at 28, to facilitate sliding coacting engagement with the support member P. As shown, a pair of spaced, oppositely disposed resilient fingers 30 are struck-out of the material of the arms 16 generally immediately adjacent the juncture thereof with the wings 26. The fingers 30 extend angularly inwardly and downwardly in a general direction toward the base 14 for camming and interlocking coacting engagement with selective portions of the expander member 8, as will be described hereinafter. In addition, a plurality, such as four, tangs 32 are provided adjacent the upper free ends of the arms 16 on opposed sides of the fingers 30 and immediately below the wing portions 26. The tangs 32 are preferably of a polygonal, such as triangular, shape and extend inwardly and generally parallel toward one another from opposed side edges of the arms 16 to provide guides for directing movement of the expander member 8 within the retainer member 4 and to prevent lateral shifting movement between the parts.

The foreshortened side arms 18 terminate adjacent the upper free ends in another pair of spaced, oppositely disposed resilient fingers 34 which are bent inwardly and downwardly in a general direction toward the base 14. As best seen in FIG. 5, the fingers 34 adjacent outer terminal edges are disposed in generally a common plane with the terminal ends of the fingers 30 and slightly below the uppermost edge of the tangs 32. The fingers 34 slightly overlie (FIG. 6) the corresponding marginal edge of the opening 22 in the base 14 while the fingers 30 are off-set outwardly of the marginal edge of the opening 22 so that the transverse distance between the fingers 30 is greater than the transverse distance between the fingers 34 in the normal condition of the retainer member 4. The fingers 34 conjunctively coact with the other fingers 30 for engagement with selective portions of the expander member 8 for holding the parts in pre-assembled and final assembled positions. Preferably, the arms 18 are provided with perforations or struck-out portions 36 to enhance their resilient spring-like characteristics.

As seen in FIGS. 1—4, the expander member 8 is preferably of a nut-like construction made from a generally rigid polymeric material such as nylon or the like. As shown, the member 8 includes a generally polygonal, such as rectangular in transverse cross-section, body 38 defined by generally parallel side 40 and end walls 42 for telescopic coacting insertion within the retainer member 4. A pair of oppositely disposed generally rigid flange portions 44 extend laterally outwardly from the opposed end walls 42 to provide a head for abutting engagement with the wings 26 on the retainer member 4, as best seen in FIG. 10.

Figure 4:
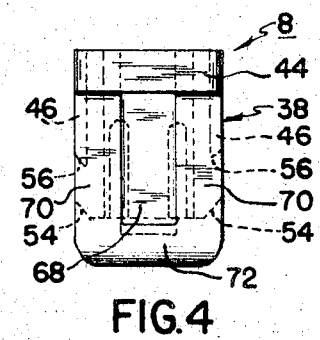
FIG. 4 is an end elevation view of the expander member of FIG. 1.
Figure 3:
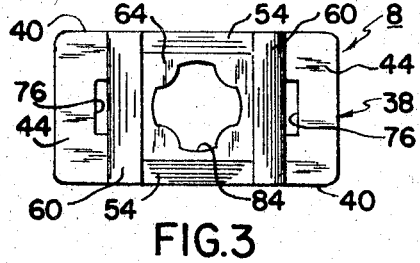
FIG. 3 is a bottom plan view of the expander member of FIG. 1.

In the form shown, the side walls 40 are provided with a pair of oppositely disposed elongated recessed channels 46 defined by longitudinally extending inner flat surfaces 48, generally parallel side ribs 50, and transversely extending shoulders 52. The channels 46 extend generally parallel to the longitudinal central axis of the body 38 and open at one end onto the head defined by the flange portion 44. The channels 46 have a width slightly greater than the width of the fingers 34 of the retainer-member 4 and have a depth so that the transverse distance between the opposed inner surfaces 48 is slightly greater than the transverse distance between the terminal ends of the fingers 34 in their normal unflexed position (FIG. 5), whereby the arms 18 may be flexed outwardly upon camming coacting engagement of the fingers 34 within the corresponding channels 46 in the installed position thereof. The shoulders 52 terminate at their lower ends in inclined surfaces 54 to facilitate snap-action coacting engagement with the fingers 34. In addition, the shoulders 52 are inclined downwardly and inwardly, as at 56, to facilitate interlocking engagement with the terminal ends of the fingers 34, as best seen in FIG. 4.

The longer end walls 42 of the body 38 are provided with co-planar extensions in the form of spaced, oppositely disposed resilient legs 60 which are rounded, as at 62, adjacent their free ends (FIG. 1) so as to define a slot 64 therebetween which facilitates initial insertion of the expander member 8 within the retainer member 4. The walls 42 including the legs 60 are provided with reduced width, axially extending channels 66 defined by generally flat inner surfaces 68, spaced parallel side ribs 70 and transverse shoulders 72 which are inclined downwardly and inwardly, as at 74, to provide snap-action interlocking coacting engagement with the fingers 30 on the retainer member 4. The channels 66 have a width greater than that of the fingers 30 and have a length greater than that of the channels 46 so as to open at one end in the form of slots, as at 76, onto the flanges 44. The channels 66 have a depth so that the transverse distance between the opposed inner surfaces 68 is greater than the transverse distance between the terminal ends of the fingers 30 so as to hold the arms 16 in an outwardly flexed condition in the final installed position of the expander member 8, as best seen in FIG. 10. By this arrangement, both sets of arms 16 and 18 are disposed in an outwardly flexed position via the fingers 30 and 34 to grippingly lock the expander member 8 within the retainer member 4 into frictional engagement with the confronting marginal edges of the aperture A in the support member P.

In the form shown, the ribs 50 and 70 and the shoulders 52 and 72 of the respective side 40 and end walls 42 are disposed in a common plane with one another to provide a guide and abutment structure for limiting axial and/or lateral shifting movement of the respective fingers 30 and 34 when disposed therein. The shoulders 52 are disposed above the shoulders 72 so that the fingers 34 are disposed for coacting engagement against the shoulders 52 while the wings 26 are disposed for engagement with the confronting undersurfaces of the flanges 44 to prevent axial movement between the parts in the assembled position thereof.

As shown, the body 38 of the expander member 8 is provided with an axially extending bore 80 which preferably has a diameter equal to or slightly greater than the maximum transverse dimension of the connector member 10. The bore 80 is provided with a plurality, such as 4, of circumferentially spaced segmental ribs 82 separated by a corresponding number of symmetrically disposed channels 84 therebetween. In this form, the transverse distance between an opposed pair of the ribs 82 is preferably less than the transverse dimension of the connector member 10 to provide a self-threading action therewith upon turning movement of the connector member 10 therethrough. By this arrangement, the channels 84 provide relief areas to receive deposited material removed from the ribs 82, as desired.

In the invention, the maximum inside transverse dimension of the body 12 of the retainer member 4 is slightly larger than the corresponding maximum outside transverse dimension of the body 38 of the expander member 8 while the minimum inside transverse dimension of the body of the retainer member 4 is slightly larger than the corresponding minimum outside transverse dimension of the body 38 of the expander member 8. Moreover, the lengthwise dimension of the body 38 of the expander member 8 below the flanges 44 is preferably approximately equal to the lengthwise dimension of the arms 16 of the retainer member 4 so that in the final inserted position, the bottoms of the legs 60 of the expander member 8 are seated against the base 14 of the retainer member 4 with the flanges 44 seated against the confronting surfaces of the wings 26, as best seen in FIG. 10. In this position, the upper terminal ends of the fingers 34 of the retainer member 4 are disposed below the flanges 44 and the outermost extremities of the wings 26 so as to abut the confronting underside of the support member P in the final installed position thereof.

As best seen in FIG. 10, the connector member 10 includes an elongated cylindrical threaded body 85 adapted to be self-threadably disposed through the bore 80 in the expander member 8. One end of the body 85 is provided with a cylindrical head 86 having a recess slot 87 for threading movement by a suitable tool. The head 86 is connected to the body 85 by a cylindrical reduced diameter portion 88 adapted to be disposed through an aperture 89 in the article A. A generally frusto-conical flange 90 is axially spaced below the portion 88 for engagement with the confronting underside of the article A for holding the same in spaced relation above the support member P in the installed position thereof.

The fastening assembly device 2 of the invention may be satisfactorily employed with various size of polygonal openings in a support member. In the form shown, the opening 6 is preferably rectangular in shape having dimensions generally equal to or slightly smaller than the corresponding dimensions of the retainer member 4. However, it is to be understood that the corresponding dimensions of the body 12 of the retainer member 4 in its normal pre-assembled condition may be slightly smaller than the corresponding dimensions of the polygonal opening in the support member, as desired.

In a typical installation, the fastening assembly device 2 can be readily pre-assembled to facilitate shipment, as a unit, for assembly at the work site. As seen in FIG. 8, this can be accomplished by partially threading the body 85 of the connector member 10 through the bore 80 in the expander member 8, whereupon, the expander member may then be inserted downwardly into the body 12 of the retainer member 4. This movement causes the fingers 30 to cam over the corresponding shoulders 72 on the expander member 8 which initially flexes the arms 16 outwardly about pivot points with the base 14, whereupon, the arms 16 then snap back into engagement with the walls 32 when the terminal ends of the fingers 30 seat against the inclined surfaces 74 of the shoulders 72. In this position, the other fingers 34 are disposed substantially in abutment against the undersurfaces 54 of the shoulders 52 so as to hold the leading end of the connector member 10 in a substantially free floating condition within the opening 22 in the base 14 of the retainer member 4. In this position, the tangs 32 cooperate with the fingers 30 and 34 to prevent axial and/or lateral shifting movement of the expander member and hence, the connector member 10 with respect to the retainer member 4.

To complete the installation, the device may then be installed with the support member P by inserting the retainer member 4 through the aperture 6 therein by applying force to the flanges 44 of the expander member and/or to the connector member 10. The expander member 8 may then be fully inserted into the body 12 of the retainer member 4 which causes the fingers 30, which hold the arms 16 in a partially outward flexed condition, to ride-up the corresponding channels 66 in the expander member 8 until the flanges 44 are compressingly seated against the confronting upper surfaces of the wings 26. This movement causes the other fingers 34 to cam over the shoulders 52 which initially flexes the arms 18 outwardly, whereupon, the arms partially snap back after the fingers 34 have been disposed within the channels 68 and against the inclined surfaces 54 on the shoulders 52. In this position, the fingers 34 are disposed in abutting engagement with the confronting underside of the support member P with the arms 16 being held in a partially outward flexed condition against the confronting marginal edges of the aperture 6 in the support member P. In addition, the resilient wings 26 of the expander member 4 are held in a resilient compressed position against the confronting upper surface of the support member P under the force imparted by the confronting undersurfaces of the flanges 44 of the expander member 8. Hence, the lateral locking of the device into the aperture 6 by means of the arms 16 precedes the axial locking of the device by means of the coacting wings 26 and fingers 34. This novel action results from the disposition of the terminal ends of fingers 30 and 34 in a common plane and the disposition of their respective cooperating shoulders 72 and 52 in axially spaced horizontal planes, with the plane of shoulders 72 being disposed below that of shoulders 52. Thus assembled, the article A may be conveniently mounted on the head 86 of the connector member 10 via the reduced diameter portion 88 and the flange 90, whereupon, the axial distance between the support member P and the article A may be conveniently adjusted by selective turning movement of the connector member through the bore 80 in the expander member, as desired.

We claim:
1. A fastening device for securement with an apertured support member comprising:
   a retainer member adapted for insertion through the aperture in said support member;
   an expander member adapted for insertion into said retainer member;
   said retainer member including a base with a pair of spaced, resilient arms extending from said base and having laterally projecting means adapted for engagement with one side of said support member;
   finger means extending inwardly from said arms for engageable coaction with said expander member to yieldably flex said arms upon insertion of said expander member into said retainer member;
   said expander member includes a generally rigid body;
   said body having abutment portions disposed adjacent the end remote from said projecting means adapted for camming coacting and interlocking engagement with said finger means;
   another pair of spaced, resilient arms extending from said base and laterally between said first mentioned pair of arms to define a generally polygonal box-like construction with said base;
   said other pair of arms having finger means extending inwardly adapted for engageable coaction with said expander member;
   said body having a polygonal shape, in transverse section, generally complementary to said box-like construction for yieldably receiving said body therein;
   said body includes opposed pairs of channel portions extending axially in a direction from said projecting means and terminating at the other end adjacent said abutment portions for receiving said finger means therein;
   said other pair of arms is foreshortened in an axial direction relative to said first mentioned pair of arms;
   the one pair of said channel portions disposed to receive the finger means of said foreshortened pair of arms; and
   said last mentioned channel pair being foreshortened in an axial direction with respect to the other pair of said channels.

2. A fastening device for securement with an apertured support member comprising:

a retainer member adapted for insertion through the aperture in said support member;

an expander member adapted for insertion into said retainer member;

said retainer member including a base with a pair of spaced, resilient arms extending from said base and having laterally projecting means adapted for engagement with one side of said support member;

finger means extending inwardly from said arms for engageable coaction with said expander member to yieldably flex said arms upon insertion of said expander member into said retainer member;

said expander member includes a generally polygonal body defined by opposed side and end walls;

said side walls being foreshortened relative to said end walls to define a recess opening therebetween;

the extensions of said end walls having abutment portions for camming and interlocking coacting engagement with said finger means;

another pair of spaced, resilient arms extending from said base between said first mentioned pair of arms and having other finger means extending inwardly therefrom; and said other finger means adapted for engagement with said expander member within said recess opening when in the initially inserted and pre-assembled position of said expander member with said retainer member.

3. A fastening device for securement with an apertured support member comprising:

a retainer member adapted for insertion through the aperture in said support member;

an expander member adapted for insertion into said retainer member;

said retainer member including a base with a pair of spaced, resilient arms extending from said base and having laterally projecting means adapted for engagement with one side of said support member;

finger means extending inwardly from said arms for engageable coaction with said expander member to yieldably flex said arms upon insertion of said expander member into said retainer member;

another pair of spaced, resilient arms extending from said base between said first mentioned pair of arms to define a generally box-like construction with said base;

said other pair of arms being foreshortened with respect to said first mentioned pair of arms and including other finger means projecting inwardly adapted for engageable coaction with said expander member and the other side of said support member;

said expander member includes oppositely disposed pairs of channel portions extending generally axially thereof adapted to receive said finger means therein; and said channel portions terminating at the ends remote from said projecting means in abutment portions adapted for camming coaction and locking engagement with said finger means;

said expander member includes at least a first pair of said channel portions and a second pair of said channel portions;

said finger means terminate in a common plane; and said abutment means of said first pair of channel portions define a common plane which is disposed below a common plane defined by the abutment means of said second pair of channel portions, so that one pair of said finger means coactingly engages said first pair abutment means before another pair of finger means coactingly engages said second pair abutment means upon axially downward movement of said expander member relative to said retainer member.

4. A fastening device for securement with an apertured support member comprising:

a retainer member adapted for insertion through the aperture in said support member;

an expander member adapted for insertion into said retainer member;

said retainer member including a pair of spaced, resilient arms extending from said base and laterally projecting means adapted for engagement with one side of said support member;

at least one other resilient arm extending from said base between said pair of arms;

a first finger means extending inwardly from each one of said pair of arms and a second finger means extending inwardly from said other resilient arm for engageably coacting with said expander member to yieldably flex said arms upon insertion of said expander member into said retainer member;

said expander member including axially extending channel portions disposed in aligned relation with and adapted to slidably receive said finger means therein;

said channel portions terminating adjacent the end remote from said projecting means in abutment portions adapted for snap-action camming engagement with said finger means;

said first finger means disposed in slidable relation within certain of said channel portions and adapted for interlocking engagement with certain of said abutment portions; and said second finger means disposed exteriorly of others of said channel portions and in abutting engagement with others of said abutment portions in the initially inserted and pre-assembled position of said expander member within said retainer member.

5. A fastening device in accordance with claim 4, wherein:
said first finger means is disposed in abutting engagement with said certain of said abutment portions.

6. A fastening device in accordance with claim 4, wherein:
said arms include tang portions extending inwardly on opposite sides of said finger means for guiding coacting engagement with said expander member.

7. A fastening device in accordance with claim 4, wherein:
the transverse distance between the opposed innermost surfaces of said channel portions aligned with said first finger means is greater than the corresponding distance between said first finger means when in their normal position prior to insertion of said expander member into said retainer member.

8. A fastening device in accordance with claim 4, wherein:
said expander member includes a generally rigid body having a head adapted for abutting engagement with said projection means in the finally installed position of said device.

9. A fastening device in accordance with claim 8, wherein:
said body includes an axial bore for threadably receiving a connector member therein.

10. A fastening device in accordance with claim 4, wherein:
the base of said retainer member includes an enlarged opening disposed generally centrally thereof adapted to freely receive said connector member therethrough.